United States Patent [19]
Omid et al.

[11] Patent Number: 5,619,703
[45] Date of Patent: Apr. 8, 1997

[54] APPARATUS AND METHOD FOR SUPPORTING MULTIPLE INTERRUPT PROTOCOLS WITH UNEQUAL NUMBER OF INTERRUPT REQUEST SIGNALS

[75] Inventors: Reza G. Omid, San Jose; Sanjiv D. Pathak, Fremont; Jafar Naji, Sunnyvale; Stephen A. Smith, Palo Alto; Sriram Ramamurthy; Jihad Y. Abudayyeh, both of Fremont; Kasturiraman Gopalaswamy, Santa Clara, all of Calif.

[73] Assignee: Cirrus Logic, Inc., Fremont, Calif.

[21] Appl. No.: 477,012

[22] Filed: Jun. 6, 1995

[51] Int. Cl.$^6$ ...................................................... G06F 13/24
[52] U.S. Cl. ............................................ 395/734; 395/500
[58] Field of Search .................................. 395/308, 500, 395/740, 831, 733, 734

[56] References Cited

U.S. PATENT DOCUMENTS

| | | |
|---|---|---|
| 4,807,282 | 2/1989 | Kazan et al. ............................ 379/284 |
| 4,890,219 | 12/1989 | Health et al. . |
| 5,101,498 | 3/1992 | Ehlig et al. ............................. 395/800 |
| 5,237,692 | 8/1993 | Raasch et al. ........................... 395/740 |
| 5,349,649 | 9/1994 | Iijima ..................................... 395/831 |
| 5,379,403 | 1/1995 | Turvy ..................................... 395/500 |
| 5,446,869 | 8/1995 | Padgett et al. ........................... 395/500 |
| 5,506,997 | 4/1996 | Maguire et al. ......................... 395/800 |

*Primary Examiner*—Jack B. Harvey
*Assistant Examiner*—Xuong Chung-Trans
*Attorney, Agent, or Firm*—Steven A. Shaw; Naren Thappeta

[57] ABSTRACT

A peripheral device capable of generating interrupt request signals compliant with the Industry Standard Architecture (ISA) protocol, and the Peripheral Component Interconnect (PCI) protocol. The peripheral device comprises a signal generator block which selectively generates either the interrupt request signals of the PCI protocol or a set of bits representative of interrupt request signals of the ISA protocol. The set of bits are transferred serially to a converter circuit which generates the interrupt request signals of the ISA protocol based on the bits. The signal generator block generates bits in such a way as to support both pulse mode and level mode interrupt request signals for the ISA protocol.

16 Claims, 10 Drawing Sheets

APPARATUS AND METHOD FOR SUPPORTING MULTIPLE INTERRUPT PROTOCOLS WITH UNEQUAL NUMBER OF INTERRUPT REQUEST SIGNALS

FIELD OF THE INVENTION

The present invention relates to interrupt protocols in computer systems. More specifically, the invention pertains to a method and apparatus for supporting multiple interrupt protocols with unequal number of interrupt request signals.

BACKGROUND OF THE INVENTION

Figure 1:
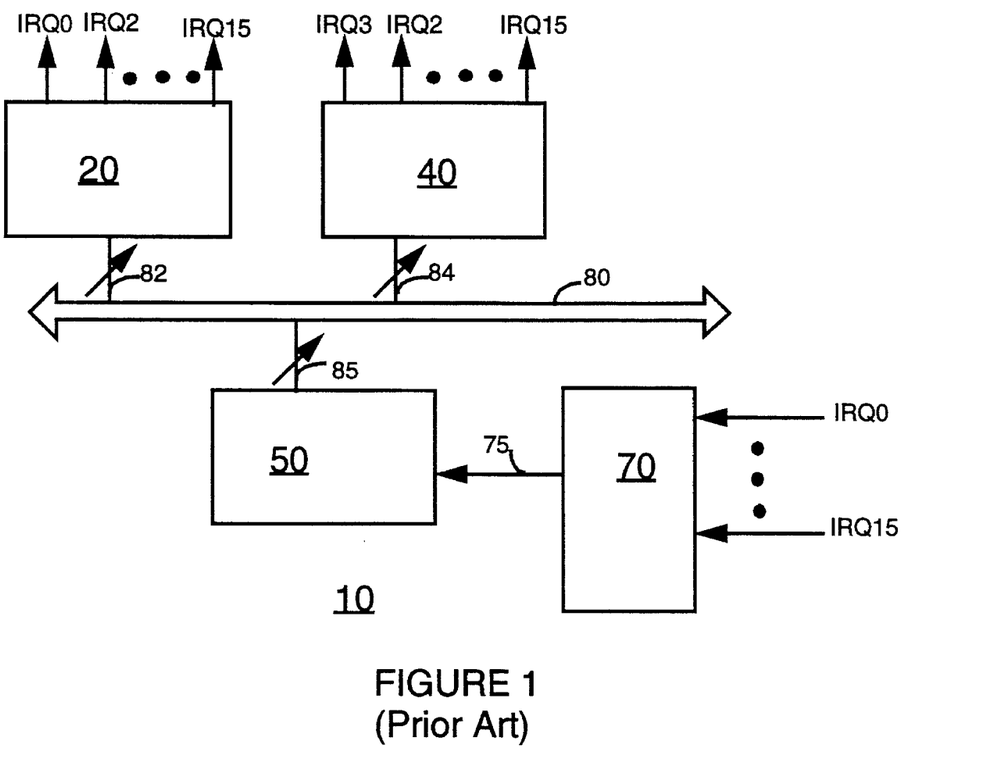
FIG. 1 is a block diagram of a prior art computer system incorporating ISA interrupt request protocol.

Computer systems incorporating the Industry Standard Architecture (ISA) compliant interrupt scheme are well-known in the prior art. FIG. 1 is a block diagram of one such computer system 10. The computer system 10 is shown to include a micro-processor 50, two peripheral devices 20 and 40, a set of interrupt request lines IRQ0–15, and an interrupt controller 70.

The peripheral device 40 is shown connected to interrupt signal lines IRQ0–15. An exemplary embodiment of the peripheral device 40 is available from Cirrus Logic Inc. as part number CL-PD6729. The peripheral device 40 generates an interrupt request signal on one of the interrupt request lines IRQ0–15 when it requires attention from the micro-processor 50. Such attention is usually required when there is some activity associated with an input/output (I/O) device attached to the peripheral device 40. For example, if a fax modem (not shown in the diagram) is attached to the peripheral device 40, and if the fax modem needs to communicate with the microprocessor 50, the peripheral device 40 generates an interrupt request signal.

The peripheral device 20 operates similar to peripheral device 40, and is also shown connected to interrupt request signal lines IRQ0–15. Both the peripheral devices 20, 40 may thus share the interrupt request signal lines IRQ0–15. The peripheral devices 20, 40 may each optionally be coupled to only a subset of the interrupt request lines IRQ0–15.

The interrupt controller 70 continuously monitors each of the interrupt request lines IRQ0–15 for an interrupt request signal. On receiving an interrupt request signal, the interrupt controller 70 typically sends a signal to the microprocessor 50 over a signal line 75 indicating the presence of an interrupt to be processed on the peripheral device. The processor 50 usually polls the peripheral devices 20,40 and processes the interrupt on the peripheral device.

Figure 2A:
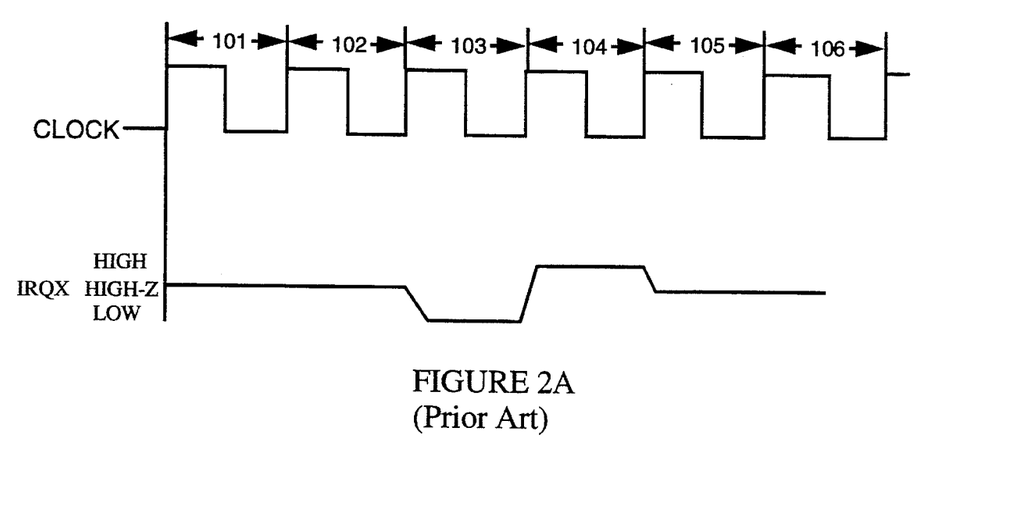
FIG. 2A illustrates a pulse signal with three states—high, low, and high-impedance.

It is further known in the prior art that different types of signals such as a pulse signal or a level signal can be used for the interrupt request signals. FIG. 2A shows a pulse signal of the prior art. In the case of a pulse signal, the interrupt request signal lines IRQ0–15 are normally in a high impedance state (shown during clock cycles 101–102). To generate an interrupt signal, the peripheral device 40 first drives the interrupt request line to an active low (shown during clock cycle 103), and then to an active high (shown during clock cycle 104). The signal levels can span multiple clock cycles. The peripheral device then drives the interrupt request signal line back to the high-impedance state.

Figure 2B:
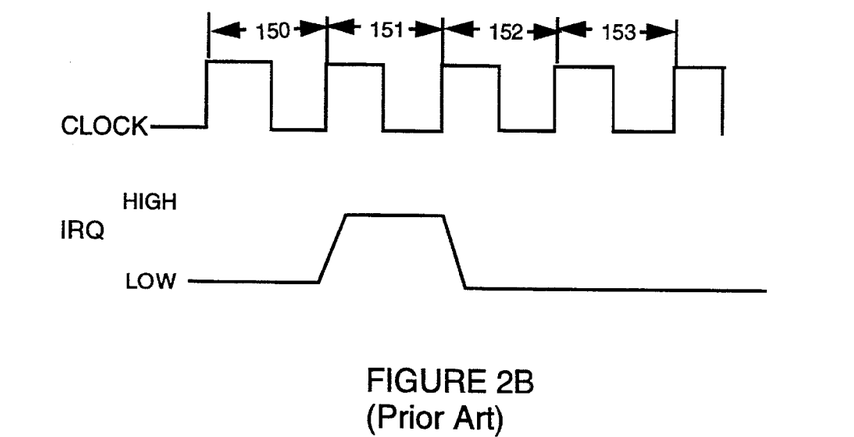
FIG. 2B illustrates a level signal used for an interrupt request signal.

FIG. 2B illustrates a level signal that can be used to signal an interrupt request signal. Here, an active high (shown during clock cycle 151) usually signals an interrupt request signal. The interrupt signal lines IRQ0–15 otherwise are driven to a low signal level shown during clock cycle 150, 152, and 153. On sensing the interrupt request, the interrupt controller 70 sends a signal to the processor 50 to indicate the presence of an interrupt.

Figure 3:
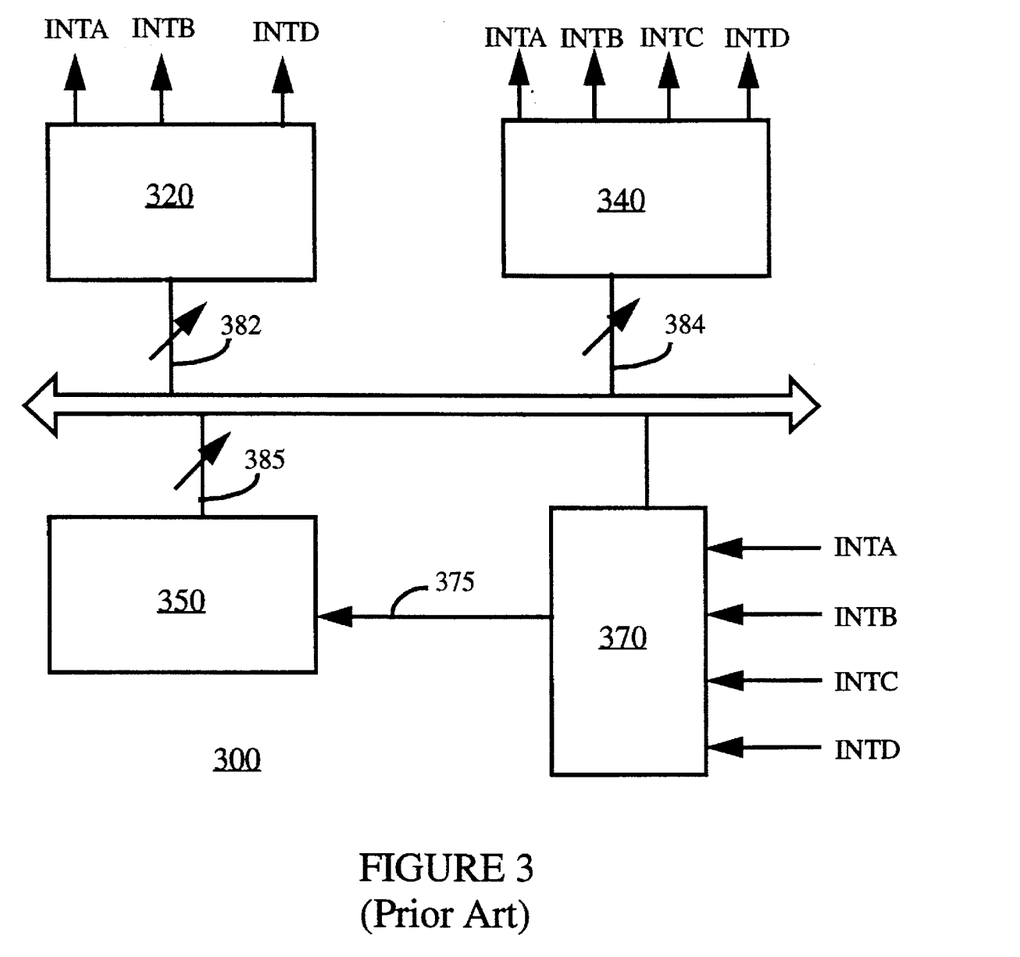
FIG. 3 is a block diagram of a prior art computer system incorporating PCI interrupt request protocol.

Recently, many computer system manufacturers have embraced another standard—peripheral component interconnect (PCI). This has lead to incorporation of the PCI interrupt scheme into many computer systems. FIG. 3 illustrates a computer system 300 incorporating the PCI interrupt scheme. Significantly, the computer system 300 includes only four interrupt request lines—INTA, INTB, INTC, and INTD. The computer system 300 is also shown with two peripheral devices 320, 340, an interrupt controller 360, and a processor 370.

The peripheral devices 320, 340 send an interrupt request signal over the interrupt request lines INTA-D to request the attention of the processor 350. The interrupt controller 370 sends a signal indicating the presence of the interrupt on the peripheral devices, and the processor 370 processes the interrupt on the peripheral devices 320, 340. For a more information on the PCI interrupt structure, the reader is referred to "PCI Local Bus Specification 2.0/2.1" which specification is incorporated herein by reference.

While the number of PCI compliant computer systems has grown recently, the ISA compliant systems continue to constitute a significant portion of the computer system market. A large portion of the software and hardware continues to be used that operates around the ISA interrupt scheme.

It has therefore become advantageous to design peripheral devices that can operate in conjunction with both the PCI interrupt scheme and the ISA interrupt scheme. Such a peripheral device can be conveniently used in either an ISA compliant system or a PCI compliant system. Due to the economies of scale associated with manufacturing a single device for both types of systems, significant cost savings can be realized. The availability of a single device to serve both type of systems avoids needless confusion that otherwise usually results in the users.

One problem that has been encountered with the design of a peripheral device that can operate with both the interrupt schemes is the differing number of pins required to support the interrupt structures of the two schemes. While the PCI interrupt structure uses only four interrupt request lines, the ISA interrupt structure could potentially use sixteen signal lines. Therefore, an ISA compliant peripheral device would require up to sixteen pins, while the PCI compliant peripheral device would require up to only four pins.

One prior solution has implemented a peripheral device with fourteen pins—ten to interface with an ISA compliant system, and the other four to interface with a PCI compliant system. This prior solution has the disadvantage that a substantial number of pins in the peripheral device remain unused when the dual-compliant peripheral device is used in a PCI compliant system. An increase in number of pins usually results in an increased manufacturing costs. The problem may be compounded if the increase in number of pins forces the integrated circuit to be packaged in a package with a higher number of pins, for example from 208 to 256 pins.

It is therefore desirable to design a peripheral device that will not require these additional pins when the peripheral device is used in the PCI systems. It is further required that this peripheral device be operable in ISA systems also.

SUMMARY OF THE INVENTION

It is therefore an object of the present invention to support two interrupt protocols with unequal interrupt request signals.

It is another object of the present invention to provide a peripheral device that will not require an additional number of pins while operating with interrupt protocols with lesser number of interrupt request signals.

It is a further object of the present invention to minimize the number of pins in the peripheral device.

These and other objects of the present invention are accomplished by a computer system including a peripheral device that supports both a first interrupt request protocol and a second interrupt request protocol. The peripheral device comprises a first chip that generates a first set of bits representative of the first interrupt request signals, and transfers the first set of bits serially over an external pin.

The peripheral device further comprises a second chip that receives the first set of bits, and generates the first set of interrupt request signals based on the first set of bits. The second chip sends the first set of interrupt request signals to an interrupt controller in the computer system.

The first chip is capable of generating a second set of interrupt request signals of a second interrupt request protocol. Therefore, the peripheral device of the present invention supports both of the interrupt request protocols.

The second chip of the present invention comprises a set of flip-flops that receive and store the first set of bits. The second chip further comprises a set of tri-state devices, each tri-state device coupled to receive an enable bit and an input bit, wherein each of the tri-state device drives an interrupt request signal line to a high-impedance state if a corresponding enable bit is set to 0 and drives the output signal line to a value corresponding to the input bit if the enable bit is set to a 1. The flip-flops provide the enable bits and the input bits to the tri-state devices.

The first chip of the present invention determines whether to drive an interrupt request signal in a pulse mode or a level mode, and generates the first set of bits such that the second chip generates a level signal or a pulse signal according to the determination.

The first chip of the present invention further comprises a core logic for generating the first set of bits, and a parallel-to-serial circuit for receiving the first set of bits, and transferring the first set of bits serially to the second chip.

The parallel-to-serial circuit further comprises a shifter circuit for receiving the first set of bits in parallel, and transferring the first set of bits one bit during each clock cycle.

DETAILED DESCRIPTION OF THE PREFERRED EMBODIMENT

Figure 4:
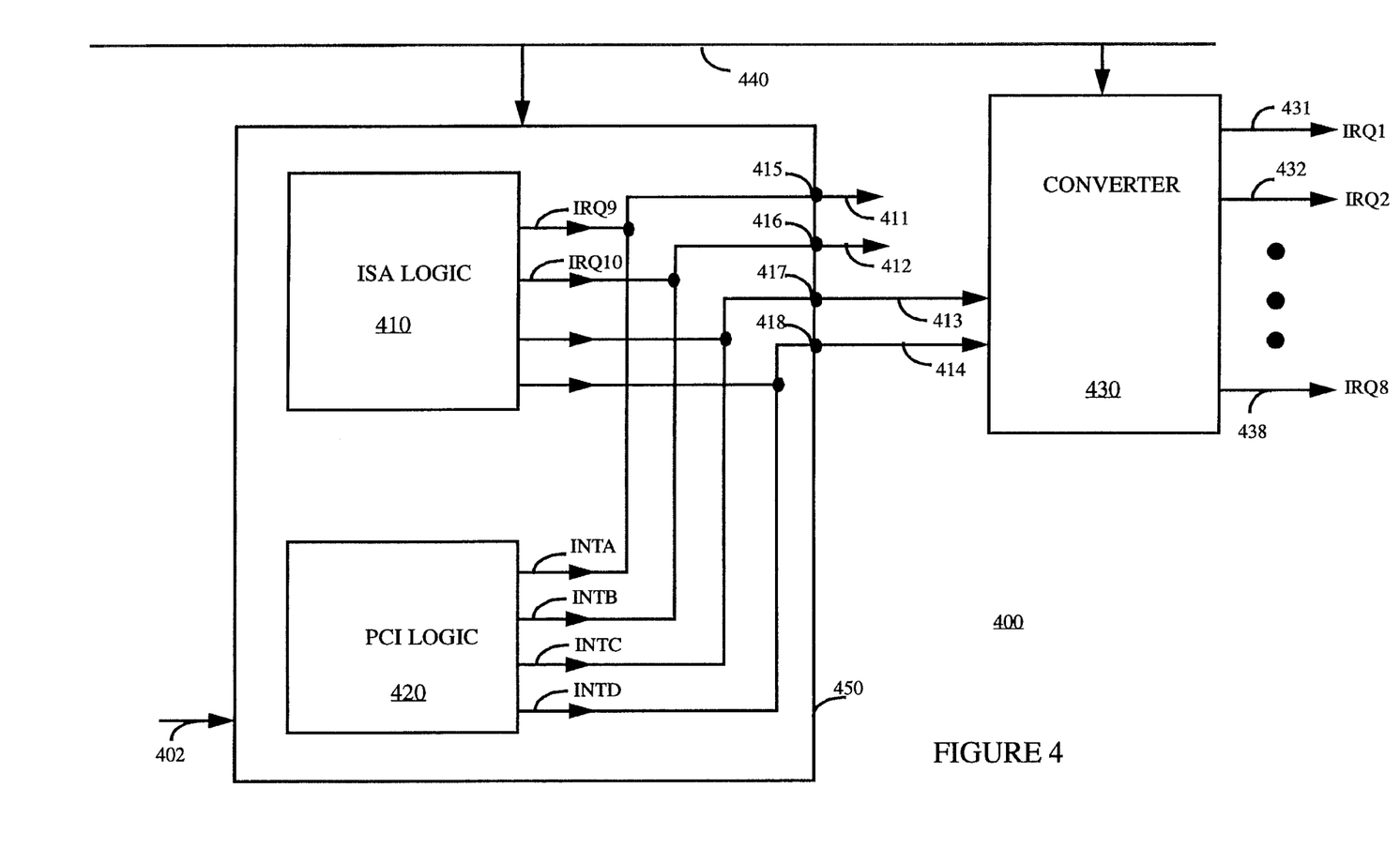
FIG. 4 is a block diagram of a peripheral device of the present invention comprising a ISA logic circuit, PCI logic circuit and a converter circuit.

FIG. 4 shows a functional diagram of a peripheral device 400 of the present invention operable in both ISA compliant computer systems and PCI compliant computer systems. The peripheral device 400 comprises a signal generator block 450, and a converter 430 both driven by a common clock signal on line 440. In the preferred embodiment, the signal generator block 450 is constructed as one semiconductor chip, and the converter 430 is constructed as another.

As will be explained, only one of the logic blocks, ISA 410 or PCI 420, is active within a given computer system, which may be selected at the computer system initialization time based on a select input on a select pin 402. If the PCI logic block is selected, the PCI logic block 420 generates the interrupt request signals INTA, INTB, INTC and INTD on the signal lines 411–414 respectively. Each of the signal lines 411–414 are coupled to each of a set of pins 415–418 respectively. The pins 415–418 are shown located outside of the semiconductor chip comprising the signal generator block 450.

If the ISA logic block 410 is selected, the ISA block 410 generates two interrupt signals IRQ9 and IRQ10 on the signal lines 411 and 412 respectively. It will be further explained that the ISA logic sends a set of bits that are representative of a set of interrupt request signals IRQ1–8 serially over a data signal line 413 in response to a condition that requires generating the interrupt request signals. The converter 430 reconverts the serially received bits into parallel interrupt request signals on the interrupt request signal lines IRQ1–8 respectively.

From the above, it will be appreciated that a peripheral device for a PCI computer system may include only the signal generator block 450, while a peripheral device for an ISA system will additionally include the converter 430 as glue logic. Such an arrangement permits a peripheral device manufacturer to manufacture a single integrated circuit chip comprising the signal generator block 450 for use in both ISA-based computer systems and PCI-based computer systems. The converter 430 can be manufactured as another semiconductor chip and installed only in the ISA-based systems. The semiconductor chip comprising the signal generator block 450 will include pins for the signal lines 411–414, while that comprising the converter 430 will include pins for the IRQ1–8 interrupt request signals.

This allows the manufacturer to realize economies of scale by manufacturing a common component for both ISA-systems and PCI-systems, and at the same time avoiding additional pins that may remain unused in the PCI-systems in the prior art solutions. Both these result in significant cost savings to a manufacturer of the peripheral device 400.

It will be readily observed that the preferred embodiment of the present invention supports only a predetermined subset of the sixteen interrupt request signal lines of the ISA interrupt scheme. It will be however apparent to one of ordinary skill in the art after reading the present specification that other subsets, or all the interrupt request signals (IRQ0–15) can be supported without departing from the scope and spirit of the present invention.

Referring to FIG. 4 again, the select pin 402 is coupled to receive a signal when the computer system is powered on. This signal is indicative of whether the computer system is a PCI-based system or an ISA-based system. This signal may be based on a bit stored in a configuration register or a dip-switch set to a particular position.

If the signal indicates that the computer system is a PCI-based system, the ISA logic 410 is automatically disabled such that the PCI-interrupt signals INTA, INTB, INTC, and INTD are automatically generated on the signal lines 411–414 respectively. The non-selected logic block is disabled in a known manner, for example by disabling the clock signal from the common clock signal 440 to the non-selected logic block. In the preferred embodiment, one of the logic blocks is 410, 420 is disabled during the computer system power-up time.

If the signal indicates that the computer system 10 is an ISA-based system, the PCI logic 420 is automatically disabled so that the signals received on the signal lines 411–414 correspond to the ISA-interrupt scheme. Specifically, the ISA logic 410 advantageously generates interrupt request signals corresponding to IRQ9 and IRQ10 on the signal lines 411, and 412 respectively. The ISA logic 410 sends a set of bits representative of the interrupt request signals IRQ1–IRQ8 serially over a data signal line 413. The ISA logic 410 further asserts a load signal line 414 after sending the set of bits.

The converter 430 receives each bit over the data signal line 413, and upon receipt of a load signal on the load signal line 414 drives the IRQ1–8 signals lines to one of high-impedance, high or low signal levels depending on the values of the bits received. The converter 430 continues driving the interrupt signal lines IRQ1–8 to the same signal level unless changed by a subsequent set of bits and load signal.

It will be further appreciated that because of the common clock signal 440 used by both the converter 430 and the signal generator block 450, a separate clock signal line is not required between the converter 430 and the signal generator block 450. This further reduces the number of pins required on the signal generator block 450 and the converter 430.

Once the select signal is received on the select pin 402, the select pin 402 may be used for other signals, thereby further reducing the number of pins in the peripheral device 400.

Figure 5:
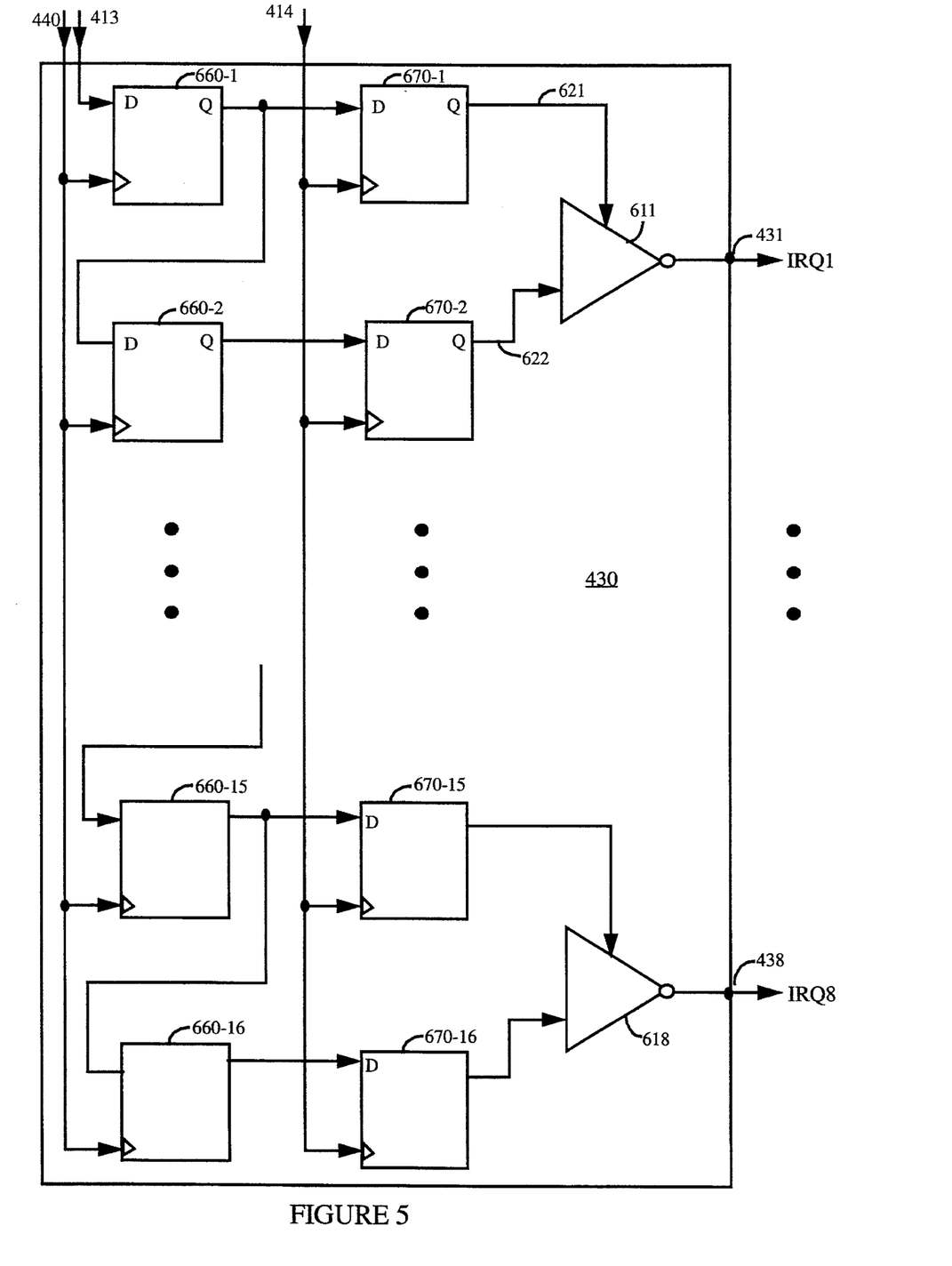
FIG. 5 is a block diagram of the converter circuit of the present invention comprising a set of tri-state devices and a set of flip-flops for driving the tri-state devices.

FIG. 5 is a block diagram of the converter 430 in the preferred embodiment of the present invention. The converter 430 comprises two sets of sixteen flip-flops 660-1 through 660-16, and 670-1 through 670-16, and eight tri-state devices 611–618. As will be explained below, the flip-flops 660-1 through 660-16 receive a set of sixteen bits over the data signal line 413 serially, and latch the sixteen bits with each bit into one flip-flop. On receiving a load signal on the load signal line 414, the sixteen bits are latched into the corresponding flip-flop 670-1 through 670-16. The flip-flops 670-1 through 670-16 drive the tri-state devices 611–618. In the preferred embodiment, the thirty two flip-flops are implemented as two separate serial-parallel converters. Each part is conventional and available from several vendors in the market place.

The tri-state device 611 comprises a data input 622, a data output IRQ1 and an enable input 621. A value of 0 on the enable input 621 causes the tri-state device 611 to drive IRQ1 to a high impedance state. A value of 1 on the enable input 621 causes the tri-state device 611 to pass the value on the data input 622 to the data output IRQ1. Therefore, a value of 1 on the enable input 621 and a value of 0 on the data input 622 causes the IRQ1 line to be driven to a zero. Similarly, a value of 1 on the enable input 621 and a value of 1 on the data input 622 causes the tri-state device 611 to be driven to a high value. The operation of tri-state devices 612–618 is similarly explained.

The flip-flop 660-1 receives bits during a clock cycle each from the ISA logic 410 over the data signal line 413. The bit received during a clock cycle into a flip-flop 660-1 is shifted to the next flip-flop 660-2 during a subsequent clock cycle. The bits in each of the flip-flops 660-1 through 660-15 are similarly shifted to the respective next flip-flop 660-2 through 660-16.

The flip-flops 670-1 through 670-16 latch the bits in the respective flip-flops 660-1 through 660-16 on receiving a load signal on the load signal line 414. The flip-flops 670-1 through 670-16 drive the tri-state devices 611–618 as explained above. As will be seen with respect to FIG. 6, the ISA logic 410 sends bits in such a fashion as to cause the tri-state devices to generate pulse signals or level signals as may be required.

The converter 430 may further include a reset signal line (not shown) which resets each of the flip-flops 670-1 through 670-16 to a value of zero. This drives all the tri-state devices 611–618 into high-impedance mode. This may be required at the computer system power-up time while all the components are being initialized.

Figure 6:
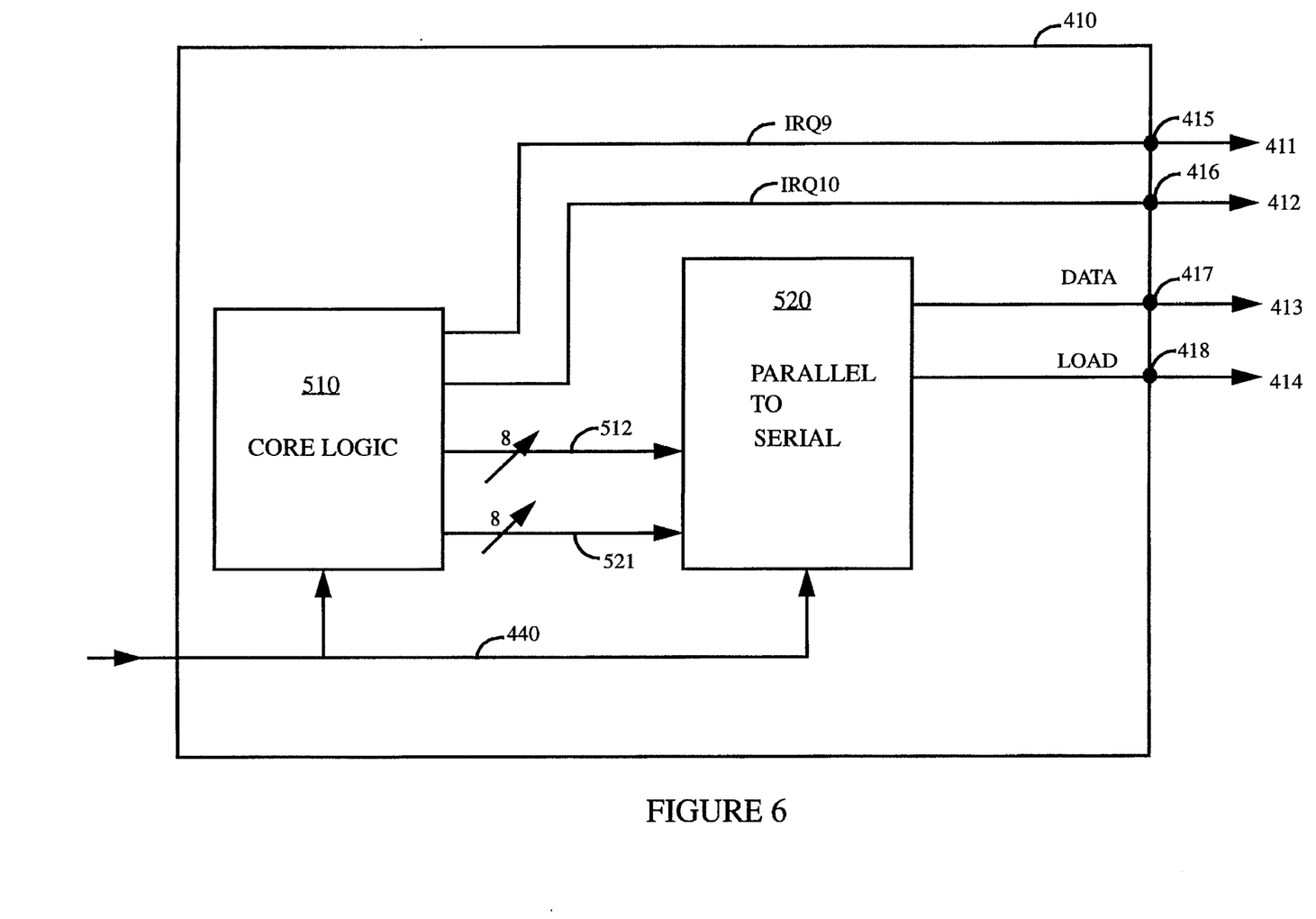
FIG. 6 shows the details of the ISA logic circuit of the present invention comprising a core logic and a parallel-to-serial conversion circuit.

FIG. 6 is a block diagram of the ISA logic 410 in the preferred embodiment of the present invention. The ISA logic 410 comprises a core logic 510 coupled to a parallel-to-serial circuit 520 by an IRQ-bit bus 512 and an enable-bit bus 521 with each bus comprising eight signal lines corresponding to the eight interrupt request signals IRQ1–8.

The core logic 510 detects a condition that requires generation of an interrupt request signal, sends a plurality of sixteen bit sets in response thereto over the IRQ-bit bus 512 and enable-bit bus 521. The sixteen bits generated correspond to the enable inputs (eight bits) and the data inputs (eight bits) of the tri-state devices 611–618. In the preferred embodiment, the core logic 510 comprises the integrated circuit of part CL-PD6729 also available from Cirrus Logic, Inc.

The parallel-to-serial circuit 520 receives in parallel each of the sixteen-bit sets, and transfers each of the sixteen bits serially over the data signal line 413. In the preferred embodiment, the parallel-to-serial circuit 520 sends the bits in the following sequence—input bit for tri-state device 618, enable input bit for tri-state device 618, input bit for tri-state device 617, enable input bit for tri-state device 617, . . . , input bit for tri-state device 611, and enable input bit for tri-state device 611.

The parallel-to-serial circuit 520 asserts a signal on the load signal line 414 after transferring each of the sixteen-bit sets. This causes the converter 430 to drive the tri-state devices 611–618 with the sixteen bits of the set transferred prior to asserting the signal.

The core logic 510 sends the sixteen bit sets in such a manner as to cause the converter 430 to generate a desired signal corresponding to an interrupt request signal on the IRQ lines IRQ1–IRQ8.

For example, if a pulse signal is to be generated, the core logic 510 sends three sets of sixteen bits (i.e. forty eight bits). The first set of sixteen bits causes the converter 430 to generate a low signal level corresponding to a desired interrupt request signal. From the explanation of FIG. 5, it should be apparent that to generate a low signal level on an interrupt request signal line, the corresponding tri-state device 611–618 should have a value of 1 corresponding to the enable input, and a value of 0 corresponding to the data input.

The second set of sixteen bits causes the converter 430 to generate a high signal. From the explanation of FIG. 5, it should be apparent that to generate a high signal level on a desired interrupt request signal line, the corresponding tri-state device 611–618 should have a value of 1 corresponding to the enable input, and a value of 1 corresponding to the data input.

The third set of sixteen bits causes the converter 430 to drive the corresponding interrupt request signal line back to a high-impedance state. To drive an interrupt request signal line to a high impedance state, the corresponding enable bit should be set to 0. It will be noted that the interrupt signal line remains in the high signal level or low signal level during the period the subsequent set of sixteen bits are transferred serially to the converter 430.

To generate a level signal, the core logic 510 sends only two sets of sixteen bits. The first set causes the converter 430 to drive the interrupt request signal line to an active high. This interrupt request signal line remains in active high during the clock cycles the subsequent sixteen bits are transferred to the converter 430. Once the second set of sixteen bits are latched into the flip-flops 670-1 through 670-16 by the assertion of the load signal line 414, the desired interrupt request line is driven back to a low signal level.

Figure 7A:
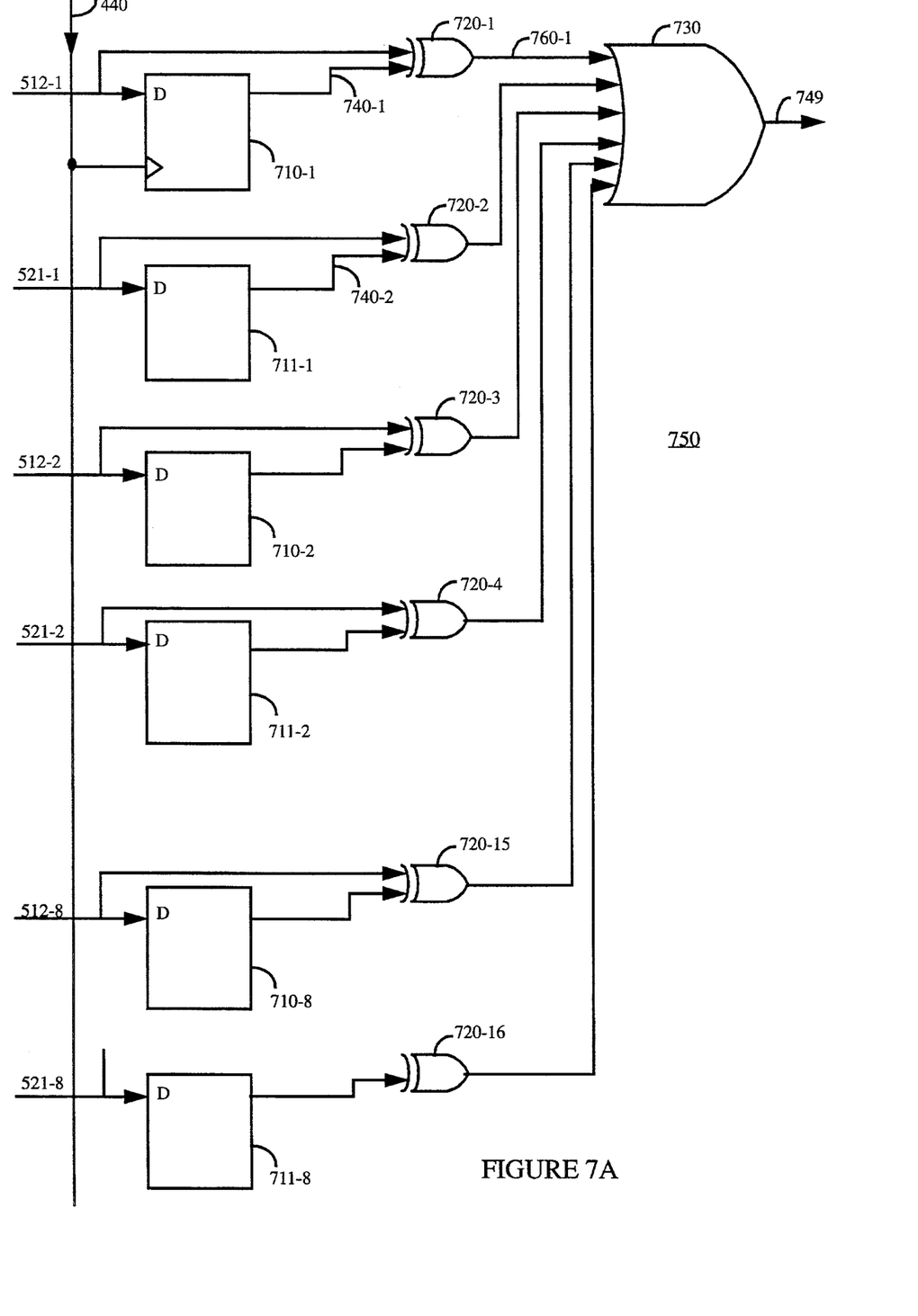
FIG. 7A is a block diagram of a detection circuit included in the parallel-to-serial circuit for to determine when to begin transferring the bits serially.
Figure 7B:
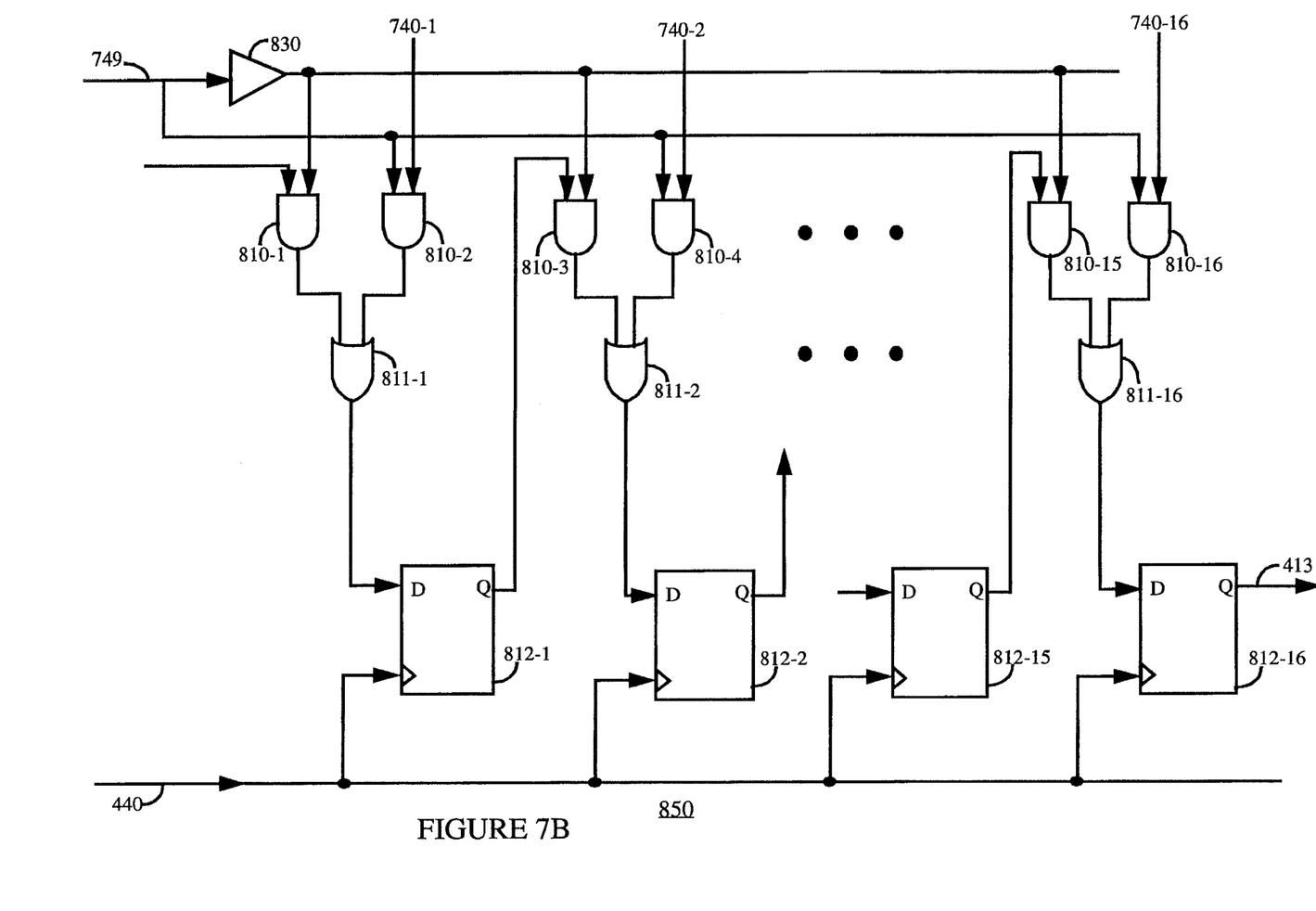
FIG. 7B is a block diagram of a shifter circuit in the parallel-to-serial circuit for receiving a set of sixteen bits from the core logic and transferring the bits serially to the converter.

FIGS. 7A and 7B together illustrate the functional diagram of the parallel-to-serial circuit 520. The parallel-to-serial circuit 520 comprises a detector circuit 750, and a shifter circuit 850. The detector circuit 750 determines whether any of the bits received on the IRQ-bit bus 512 or the enable-bit bus 521 is different from the corresponding bit previously received. If so, the shifter circuit 850 begins transferring serially the sixteen bits over the data signal line 413.

Now with reference to FIG. 7A, the detector circuit 750 comprises flip-flops 710-1 through 710-8 for receiving the eight bits from the IRQ-bit bus 512, and flip-flops 711-1 through 711-8 for receiving the eight bits from the enable-bit bus 521. Both the input and output of the flip-flop 710-1 are coupled as inputs to an XOR-gate 720-1, which generates an output of 0 if the two inputs are equal, and an output of 1 otherwise. Similarly, detector circuit 750 comprises XOR gates 720-2 through 720-16 each corresponding to one of the flip-flops 711-2 though 711-8 and 710-2 through 710-8. The outputs of the XOR gates 720-1 through 720-16 are fed to a logical OR circuit 730.

In operation, the output of the logical OR circuit 730 generates a 1 if any of the bits received on the buses 521, and 512 are different from the corresponding bit received previously. For example, if flip-flop 710-1 receives a 1 during one clock cycle, and receives a 0 during a later clock cycle, the corresponding XOR gate 720-1 generates a 1 on the signal line 760-1, which causes the logical OR circuit 730 to generate a 1 on the output line 749.

A value of 1 on the output line 749 causes the shifter circuit 850 to begin serially transmitting the bits stored in the flip flops 710-1 through 710-8 and 711-1 through 711-8 over the data signal line data signal line 413 which is explained below.

Now with reference to FIG. 7B, when a value of 1 is present on the output line 749, the values on the output lines 740-1 through 740-16 (i.e. the data stored in the flip-flops 710-1 through 710-8 and 711-1 through 711-8 of FIG. 7A) are loaded into the corresponding flip-flops 812-1 through 812-16. On the other hand, if a value of 0 is present on the output line 749, the bits in the flip-flops 812-1 through 812-15 are shifted to the successive flip-flops 812-2 through 812-16 respectively. At the same time, the bit in the last flip-flop 812-16 is shifted onto the data signal line 413.

Therefore, during sixteen clock cycles, the sixteen bits sent by the core logic 510 and loaded into the parallel-to-serial circuit 520, are transferred serially over the data signal line 413. The parallel-to-serial circuit 520 then asserts a signal on the load signal line 414 to cause the converter 430 to generate signals on the interrupt request lines IRQ1–8.

As explained with respect to FIG. 6 above, the core logic 510 chooses the values in each of the sixteen bits in such a way as to drive the desired interrupt request signal line to a specific level (i.e. high, low or high-impedance). In addition, the core logic 510 sends multiple sets of the sixteen-bits to achieve a desired type of signal (for example, level signal or pulse signal) as explained with respect to FIG. 8 below.

Figure 8:
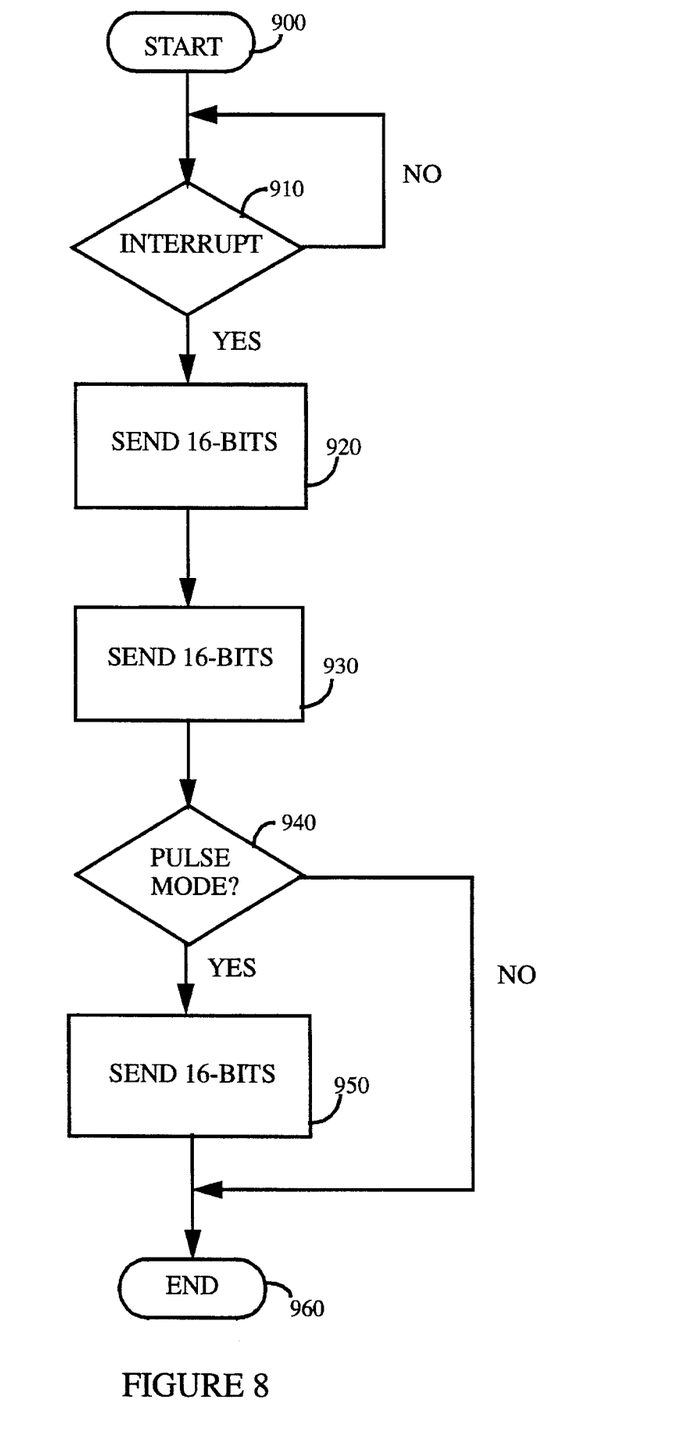
FIG. 8 illustrates a state machine of the parallel-to-serial circuit.

FIG. 8 shows a state diagram of the core logic 510 of the present invention. In step 910, the core logic 510 determines the existence of a condition requiring the generation of an interrupt request signal. Such condition can be for example due to insertion of a PCMCIA card into the peripheral device 400. Based on the condition, the core logic 510 determines an appropriate interrupt request signal IRQ1–8 to be generated.

The core logic 510 further determines the type of signal (level mode or pulse mode) that needs to be generated corresponding to the interrupt request signal. The core logic 510 may make such a determination based on for example registers corresponding to each of the interrupts.

In step 920, the core logic 510 sends a first set of sixteen-bits, with eight bits each on the bus 521 and IRQ-bit bus 512 respectively. The sixteen bits correspond to the input bits and ,the enable bits of the tri-state devices 611–618. For the tri-state devices required to drive the interrupt requests in the pulse mode, the values corresponding to the enable inputs are normally zero so as to drive the corresponding interrupt request signal lines to a high-impedance state. However, for the pulse mode interrupt request lines that need to be asserted, the core logic 510 sends a value of 0 for the input bit and a 1 for the output bit. This causes the corresponding interrupt request signal to be driven to a low signal level.

On the other hand, for level mode operation, the core logic 510 sends a value of 1 for the enable bits. When the interrupt request signals need not be asserted, the core logic 510 sends a value of 0 corresponding to the input bits. However, when a level mode interrupt request signal is to be asserted, the core logic 510 sends a 1 corresponding to the input bit of that interrupt request signal.

During step 930, the core logic 510 sends a second set of the sixteen bits. For the pulse mode interrupt request signals that need to be asserted, the core logic 510 sends a value of 1 corresponding to the input bit and a value of 1 corresponding to the enable bit. This causes the corresponding interrupt request signal line to be driven to a high value.

For the level mode interrupt request signals, the core logic 510 sends a value of 0 corresponding to the input bits to drive the corresponding interrupt request signal line to a low level.

During step 940, the core logic 510 determines whether the interrupt request signal is of level mode type or pulse mode type. Only if the interrupt request signal being asserted is of pulse, mode, the core logic 510 sends a third set of sixteen-bits over the IRQ-bit bus 512 and enable-bit bus 521 during step 950. In this third set, the core logic 510 sends a value of zero corresponding to the enable bit to drive the corresponding interrupt request signal line to a high-impedance state. In step 960, the core logic 510 ends the process for this iteration, and goes back to the start step 900. The core logic 510 continues monitoring for a condition that requires generation of an interrupt in step 910.

Figure 9:
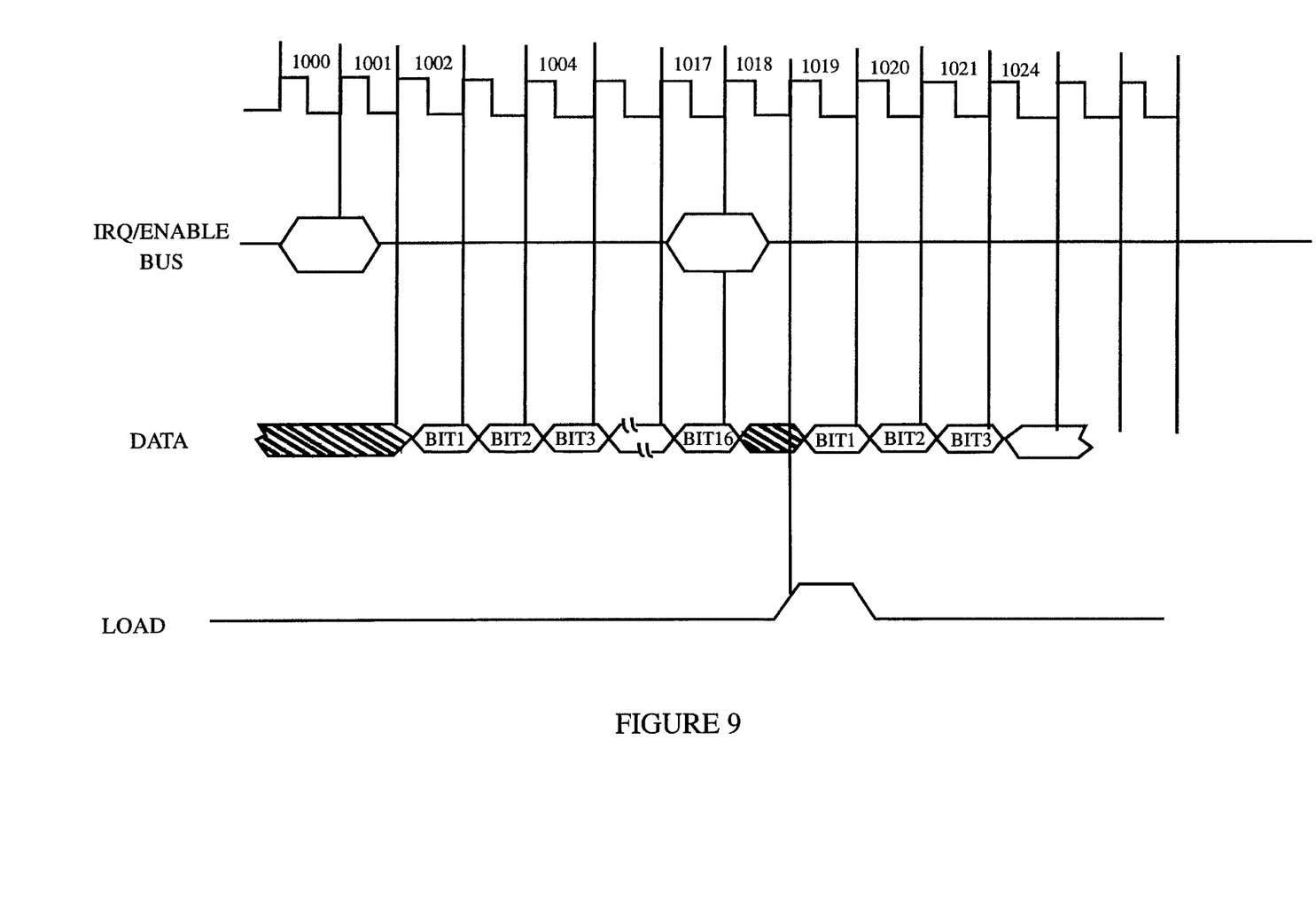
FIG. 9 illustrates the various signals in generating a pulse interrupt request signal within the peripheral device of the present invention.

FIG. 9 illustrates the timing relationship between various signal in the operation of the peripheral device 400. During clock cycle 1000, the core logic 510 sends the sixteen bits corresponding to the first set.

During clock cycle 1001, the parallel-to-serial circuit 520 latches the sixteen bits in the flip-flops 710-1 through 710-8 and 711-1 through 711-8. Since the core logic 510 is causing at least one interrupt request signal to be generated, at least one of the sixteen bits will be different from that stored in the flip-flops prior to the receipt of the bits during clock cycle 1001. Therefore, a value of 1 is generated on the output line 749 (of FIG. 7A).

During clock cycle 1002, in response to a one of the output line 749, the bits in the flip-flops 710-1 through 710-8 and 711-1 through 711-8 are latched into the flip-flops 812-1 through 812-16.

During clock cycles 1003–1018, the bits stored in the flip-flops 812-1 through 812-16 are shifted out, one bit during each clock cycle, over the data signal line 413. The sixteen bits are stored, in the flip-flops 660-1 through 660-16.

During clock cycle 1017 the core logic 510 sends the next set of sixteen bits over the enable/IRQ buses 512/521. The sixteen bits are latched into the flip-flops 710-1 through 710-8 and 711-1 through 711-8. During clock cycle 1018 the sixteen bits are latched into the flip-flops 812-1 through 812-16.

Prior to the beginning of clock cycle 1019, the parallel-to-serial circuit 520 asserts the load signal line 414 causing the sixteen transferred during clock cycles 1003–1018 to be loaded from the flip-flops 660-1 through 660-16 into the flip-flops 670-1 through 670-16. Since the interrupt request signal lines IRQ1–8 are driven by the data in the flip-flops 670-1 through 670-16, the signal levels will correspond to the sixteen bits transferred to the converter 430 during clock cycles 1003–1018.

During clock cycle 1019, the parallel-to-serial circuit 520 begins serial transmission of the second set over the data signal line 413 begins. Similar to the first set, the sixteen bits are transferred during clock cycles 1019–1034 (not shown in diagram). The parallel-to-serial circuit 520 then asserts the load signal line 414 prior to the beginning of clock cycle 1020 causing the interrupt request signals to be asserted corresponding to the bits in the second set.

As explained with respect to FIG. 8, the core logic 510 may send a third set of sixteen bits if the interrupt request signal desired to be asserted is to be operated in the pulse mode. The third set would operate to drive the desired interrupt request signal line to be driven back into the high-impedance mode.

Hence the peripheral device 400 of the present invention is operable with ISA interrupt scheme supporting both the pulse mode interrupt request signals and level mode interrupt request signals. Since the peripheral device 400 also generates the PCI-compliant interrupt request signals by means of the PCI logic 420, the peripheral device 400 is operable with both the PCI interrupt scheme and the ISA interrupt scheme.

While operating in a PCI compliant computer system (for example computer system 300), an integrated circuit comprising the converter 430 is not needed, and only the signal generator block 450 is used. While operating in a ISA-compliant computer system 10, integrated circuits comprising both the signal generator block 450 and the converter 430 will be included.

The preferred embodiment of the present invention therefore permits a peripheral device manufacturer to manufacture the two blocks, signal generator block 450 and converter 430, as two separate semiconductor chips. The PCI-compliant systems will only require the chip comprising the signal generator block 450, while the ISA-compliant computer systems will require both the chips. This enables the manufacturer to realize cost savings with respect to PCI-compliant systems, and at the same time allow the solution to operate with the ISA compliant systems.

The present invention has been described relative to a preferred embodiment. It will be apparent to one of ordinary skill in the art after reading the teachings of this patent document that further modifications can be made without departing from the spirit and scope of the invention as defined in the claims appended hereto.

What we claim is:

1. A peripheral device operable with an interrupt controller in a computer system capable of supporting a first interrupt type responsive to a first bus protocol or a second interrupt type responsive to a second bus protocol, wherein said first or said second interrupt type comprise a first and a second plurality of interrupt request signals respectively, said peripheral device comprising a converter circuit coupled to a signal generation circuit for receiving a first plurality of interrupt request signals during a first plurality of clock cycles, and generating a second plurality of interrupt request signals over a third set of external pins during a second plurality of clock cycles to an interrupt controller; and wherein said signal generation circuit and said converter circuit are both driven by a common system clock signal, said converter circuit comprising:

a plurality of tri-state devices, each of said devices being coupled to receive an enable bit and an input bit of a corresponding interrupt request signal, each of said plurality of tri-state devices outputting said input bit on a corresponding pin in said third set of external pins if said enable bit is set to a first value, and driving said corresponding pin to a high-impedance state if said enable bit is set to a second value; and a plurality of latches coupled to a second logic circuit to receive and store a first set of data bits, each of said plurality of latches being coupled to each of said plurality of tri-state devices, and wherein said first set of bits comprise said input bits and said enable bits.

2. The peripheral device of claim 1 wherein said second set of external pins comprise a first pin and wherein said second logic circuit serially transmits said first set of bits over to said first pin.

3. The peripheral device of claim 2 wherein at least one of said second plurality of interrupt request signals provided to said interrupt controller comprises a pulse signal.

4. The peripheral device of claim 3 wherein at least one of said second plurality of interrupt request signals provided to said interrupt controller comprises a level signal.

5. The peripheral device of claim 4 wherein said second logic circuit comprises:

a core logic circuit for generating said first set of data bits; and a parallel-to-serial circuit for receiving said first set of data bits, and serially transferring said first set of data bits over said first pin.

6. The peripheral device of claim 5 further comprising an external select pin for selectively disabling either said first logic circuit or said second logic circuit from generating said first plurality and said second plurality of interrupt signal requests respectively upon receipt of a select signal over said select pin during initialization of said device.

7. A peripheral device operable with an interrupt controller in a computer system capable of supporting a first interrupt type responsive to a first bus protocol or a second interrupt type responsive to a second bus protocol, wherein said first or said second interrupt type comprise a first and a second plurality of interrupt request signals respectively, said peripheral device comprising:

a first integrated circuit for generating said first plurality of interrupt request signals responsive to said first interrupt type, and providing said first plurality of interrupt request signals over a first set of external pins to said interrupt controller;

a second integrated circuit for generating said second plurality of interrupt request signals responsive to said second interrupt type, and wherein a first set of bits representing said second plurality of interrupt request signals is transmitted over a second set of external pins during a first plurality of clock cycles to said interrupt controller; and a converter circuit coupled to said first integrated circuit or said second integrated circuit for receiving said first set of bits during said first plurality of clock cycles, and generating said second plurality of interrupt request signals responsive to said first set of bits over a third set of pins during a second plurality of clock cycles to said interrupt controller, said converter circuit comprising:

a plurality of tri-state devices, each of said tri-state devices coupled to receive an enable bit and an input bit, wherein said first set of bits comprise said enable bits and said input bits, wherein each of said tri-state device drive an output signal line to a high-impedance state if a corresponding enable bit is set to a first value and drives said output signal line to a value corresponding to said input bit if the enable bit is set to a second value; and a plurality of flip-flops coupled to said plurality of tri-state devices for receiving said first set of bits, and providing said enable bits and said input bits to said tri-state devices.

8. The peripheral device of claim 7 wherein said second chip generates a level signal on one of said interrupt request signal lines in response to said first set of bits generated by said first integrated circuit.

9. The peripheral device of claim 8 wherein said first integrated circuit comprises:

a core logic for generating said first set of data bits; and a parallel-to-serial circuit for receiving said first set of data bits, and transferring one said first set of bits serially over said first external pin to said second integrated circuit.

10. A computer system comprising:

a peripheral device operable in a first interrupt type or a second interrupt type, said first interrupt protocol comprising a first plurality of interrupt request signals and said second interrupt protocol comprising a second plurality of interrupt request signals, and wherein said first set of interrupt request signals comprise a lesser number of interrupt request signals than said second set of interrupt request signals, said peripheral device comprising:

a first logic circuit for generating said first plurality of interrupt request signals, and providing said first plurality of interrupt request signals over a first set of external pins;

a second logic circuit for generating a first set of bits corresponding to said second interrupt protocol, and sending said first set of bits over a second set of pins during a plurality of clock cycles; and a converter circuit coupled to said second logic circuit for receiving said first set of bits during said plurality of clock cycles, and generating said second plurality of interrupt request signals responsive to said first set of bits over a third set of pins to an interrupt controller, said interrupt controller coupled to said converter circuit for receiving said interrupt request signals, and generating an indication signal indicative of the presence of an interrupt request signal on one of said interrupt request lines; and a processor coupled said interrupt controller for processing said interrupt request signals in response to said indication signal, said converter circuit comprising:

a plurality of tri-state devices, each of said devices coupled to receive an enable bit and an input bit of a corresponding interrupt request signal, each of said tri-state devices outputting said input bit on a corresponding pin in said third set of pins if said enable bit is set to a first value, and driving said corresponding pin to a high-impedance state if said enable bit is set to a second value; and a plurality of latches the inputs of which are coupled to said second logic circuit to receive said first set of bits, each of said latches storing each of said first set of bits, the outputs of each of said plurality of latches coupled to each of said tri-state devices wherein said first set of bits comprise said input bits and said enable bits.

11. The peripheral device of claim 10 wherein at least one of said second set of interrupt request signals provided to said interrupt controller comprises a pulse signal.

12. The peripheral device of claim 11 wherein at least one of said second set of interrupt request signals provided to said interrupt controller comprises a level signal.

13. The peripheral device of claim 12 wherein said second logic circuit comprises:

a core logic circuit for generating said first set of bits; and a parallel-to-serial circuit for receiving said first set of data bits, and transferring said first set of data bits over said first pin.

14. The peripheral device of claim 13 further comprising a select pin, wherein said first logic circuit is disabled from generating said first set of interrupt signal requests upon receipt of a select signal over said select pin.

15. The peripheral device of claim 14 wherein the second interrupt type is an ISA interrupt protocol.

16. The peripheral device of claim 15 wherein the first interrupt type is a PCI interrupt protocol.

* * * * *

UNITED STATES PATENT AND TRADEMARK OFFICE
CERTIFICATE OF CORRECTION

PATENT NO. : 5,619,703

DATED : April 8, 1997

INVENTOR(S) : Omid, et al.

Page 1 of 2

It is certified that error appears in the above-indentified patent and that said Letters Patent is hereby corrected as shown below:

At column 2, line 12, replace "360" with --370--.

At column 2, line 13, replace "370" with --350--.

At column 2, line 18, replace "370" with --350--.

At column 8, line 52, replace "output" with --enable--.

In claim 7, column 11, line 21, replace "or" with --and--.

In claim 7, column 11, lines 34-35, replace "said interrupt controller" with --a converter circuit--.

UNITED STATES PATENT AND TRADEMARK OFFICE
CERTIFICATE OF CORRECTION

PATENT NO. : 5,619,703

DATED : April 8, 1997

INVENTOR(S) : Omid, et al.

It is certified that error appears in the above-indentified patent and that said Letters Patent is hereby corrected as shown below:

In claim 7, column 11, line 36, replace "a" with --said--.

In claim 7, column 11, line 47, replace "device drive" with --devices drives--.

Signed and Sealed this

Sixteenth Day of September, 1997

Attest:

BRUCE LEHMAN

Attesting Officer     Commissioner of Patents and Trademarks